United States Patent [19]

Okubo

[11] Patent Number: 4,461,463

[45] Date of Patent: Jul. 24, 1984

[54] THREE-AXIS SPHERICAL GIMBAL MOUNT

[75] Inventor: Shigeo Okubo, Menlo Park, Calif.

[73] Assignee: Design Professionals Financial Corporation, Monterey, Calif.

[21] Appl. No.: 467,706

[22] Filed: Feb. 18, 1983

Related U.S. Application Data

[63] Continuation of Ser. No. 206,317, Nov. 12, 1980, abandoned.

[51] Int. Cl.³ .............................................. B23Q 3/04
[52] U.S. Cl. ........................................ 269/60; 269/75; 269/8
[58] Field of Search ..................... 269/60, 75, 8, 309; 248/182, 183, 184, 185, 181, 288.3, 288.5

[56] References Cited

U.S. PATENT DOCUMENTS

| | | | |
|---|---|---|---|
| 1,166,018 | 12/1915 | Soresi | 248/181 X |
| 1,883,276 | 10/1932 | Zerk | 248/181 |
| 1,962,547 | 6/1934 | Zerk | 248/181 |
| 2,993,395 | 7/1961 | Bohn | 269/75 |
| 3,575,369 | 4/1971 | Tetlow | 248/181 |
| 3,788,633 | 1/1974 | Cho | 269/60 |

FOREIGN PATENT DOCUMENTS

| | | | |
|---|---|---|---|
| 353041 | 5/1922 | Fed. Rep. of Germany | 269/60 |
| 507599 | 12/1919 | France | 269/60 |

Primary Examiner—Robert C. Watson
Attorney, Agent, or Firm—Townsend and Townsend

[57] ABSTRACT

Apparatus for providing a surface angularly adjustable with respect to a reference surface includes a substantially spherical ferromagnetic mount having a flattened surface thereon, an annular-shaped magnet disposed between the mount and the reference surface for magnetically holding the mount in a desired position with respect to the reference surface, and a series of openings formed in the spherical ferromagnetic mount into which rods may be inserted and the outwardly extending end thereof adjusted to thereby adjust the angular orientation of the surface on the sphere with respect to the reference surface.

8 Claims, 1 Drawing Figure

U.S. Patent　　　　Jul. 24, 1984　　　　4,461,463
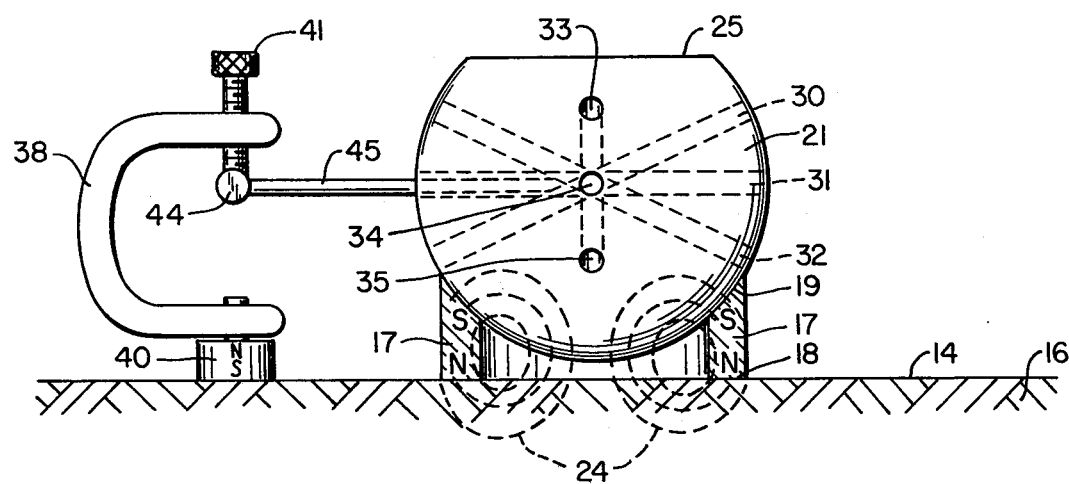
FIG._1.

THREE-AXIS SPHERICAL GIMBAL MOUNT

This is a continuation of application Ser. No. 06/206,317, filed Nov. 12, 1980, now abandoned.

BACKGROUND OF THE INVENTION

1. Field of the Invention

This invention relates to apparatus for providing a surface which is angularly adjustable with respect to a reference surface. In particular, the invention relates to apparatus in which a sphere includes a surface and the sphere is angularly adjustable by being magnetically adhered to the reference surface.

2. Prior Art

Numerous mounting devices are known in the prior art for orienting a surface with respect to another surface. Such mounting devices are used for a variety of tasks including: fabrication and mounting of optical devices, surface gauge preparation and calibration, alignment of specimens being examined in optical and electronic instruments, positioning and alignment of semiconductor wafers during various process sequences, and for other uses. Unfortunately, such prior art devices involve various moving parts mechanically connected to each other. The mechanical connections create resonances, instabilities, and hysteresis, making the prior art devices difficult to adjust and maintain in alignment. Further, such devices have typically been incapable of being non-destructively attached to a reference surface oriented at an appreciable angle with respect to horizontal.

SUMMARY OF THE INVENTION

This invention provides a mount which is nearly infinitely adjustable in any direction, yet attaches quickly and non-destructively to a reference surface. The invention can be used on reference surfaces which are not horizontal, and can even be suspended from such reference surfaces.

In one embodiment the apparatus for providing a selected surface angularly adjustable with respect to a reference surface comprises a substantially spherical ferromagnetic mount having the selected surface thereon, magnetic attachment means attached to the reference surface and disposed between the mount and the reference surface for magnetically holding the mount in a desired position with respect to the reference surface, and adjustment means for rotating the mount with respect to the magnetic support means. In the preferred embodiment the selected surface is a plane taken through the sphere perpendicular to a radius of the sphere, while the magnetic attachment means is an annular shaped magnet having a partially spherical seat. In one embodiment the adjustment means includes a plurality of openings in the spherical ferromagnetic mount into which one or more members have been inserted. The orientation of the selected surface may be adjusted by adjusting the position of the protruding ends of the members with respect to the reference surface.

BRIEF DESCRIPTION OF THE DRAWINGS

FIG. 1 is a schematic view of one embodiment of the invention.

DETAILED DESCRIPTION

One embodiment of the apparatus for providing a surface 25 angularly adjustable with respect to a reference surface 14 is shown in FIG. 1. A base 16 includes a reference surface 14 which is typically planar. An annular shaped magnet 17 is magnetically adhered, or otherwise attached, to surface 14 of base 16. As shown the lower surface 18 of magnet 17 may be contoured to suit the contours of surface 14. The upper surface of annular magnet 17 is contoured to provide a seat for spherical mount 21, which is magnetically adhered to magnet 17. Thus sphere 21 will typically be ferromagnetic, although other materials which are susceptible to magnetic forces may also be used. In this fashion a toroidal magnetic field 24, represented in cross-section by dashed lines in FIG. 1, is generated by magnet 17 to adjustably adhere sphere 21 to magnet 17, and therefore in a fixed relation to base 16. Sphere 21 also includes a selected reference face 25. Although in most embodiments object 21 will not be truly spherical because of the contour of surface 25, the term "sphere" is used herein to refer to object 21.

In the preferred embodiment, surface 25 will be planar and taken through sphere 21 perpendicular to a radius thereof. Depending on the application, however, surface 25 may be fabricated in any desired contour. For example, in some embodiments of the invention it may be desirable to recess a key-shaped opening in surface 25 to adapt it to a protrusion on the object to be disposed on surface 25 of mount 21. Other variations in the contour of surface 25 will be apparent depending on the particular use for mount 21.

The apparatus shown provides several advantages over prior art gimbal mounts. It is easily adjusted in three axes, and provides a stable, non-resonant structure. Depending upon the strength of magnetic field 24 and the amount of holding force to be applied to sphere 21, the width of the gap between sphere 21 and surface 14 may be adjusted. The diameter of annular magnet 17 may be increased or decreased as desired to vary the total angular adjustment capability of the apparatus.

Also shown in FIG. 1 is one technique for providing angular adjustment of surface 25 with respect to surface 14. As shown, a plurality of openings, 30 through 35, are made in sphere 21. Typically these extend completely through sphere 21, however, openings extending only partially into the sphere may also be used. A micrometer 38 is positioned nearby, for example, by use of magnet 40. Micrometer 38 includes an adjusting screw 41 for raising and lowering one end of rod 45, which is pivotally attached to adjusting screw 41 by a joint 44. Turning screw 41 raises and lowers the end of rod 45 extending from sphere 21, thereby changing the angle between bore 31 and reference surface 14. In this manner surface 25 may be placed in a desired angular orientation relative to surface 14. Similarly, another micrometer (not shown) may be positioned in proximity to another rod in another of the openings 30 to 35 for adjustment of surface 25 in another direction. The length of rod 45 may be adjusted to provided varying degress of adjustment sensitivity.

Although one embodiment of the invention is shown in FIG. 1, it will be apparent that many variations may be made in the embodiment without departing from the scope of the appended claims, which are intended to more fully characterize the invention. For example, in some embodiment the mount may be curved differently if the surface is not to be free to rotate in certain directions.

What is claimed is:

1. An apparatus for providing a surface angularly adjustable with respect to a reference surface, said apparatus comprising:
    a magnetizable mount in the shape of a sphere having a selected surface region thereon;
    magnetic holding means disposed between the mount and the reference surface for magnetically adhering the mount to the reference surface with sufficient holding force to provide a stable non-resonant structure while permitting said mount to be manually adjusted about three axes of rotation; and
    adjustment means for angularly positioning the mount about three axes with respect to the magnetic attachment means, said adjustment means including a plurality of openings entering into the mount from different angular locations on the surface of the sphere and a rod-shaped member adapted to be removable fitted into said openings for manual adjustment over a wide range of angles about said three axes.

2. Apparatus as in claim 1 wherein the mount is substantially spherical and the selected surface is a plane taken through the sphere perpendicular to a radii of the sphere.

3. Apparatus as in claim 2 wherein the magnetic holding means is an annular shaped magnet.

4. Apparatus as in claim 3 wherein the reference surface is ferromagnetic and the magnetic holding means is magnetically adhered to the reference surface.

5. Apparatus as in claim 3 wherein the magnet is one of a permanent magnet or an electromagnet.

6. An apparatus for providing a surface angularly adjustable with respect to a reference surface, said apparatus comprising:
    a magnetizable mount having a selected surface region thereon;
    magnetic attachment means disposed between the mount and the reference surface for magnetically holding the mount in a desired position with respect to the reference surface; and
    adjustment means for angularly positioning the mount about three axes with respect to the magnetic attachment means, said adjustment means including a micrometer, an opening in the mount, and a rod-shaped member adapted to be fitted into said opening for adjustment by said micrometer.

7. The combination of claim 6 wherein said adjustment means includes a plurality of openings in the mount, and wherein said rod-shaped member is adapted to be fitted into said plurality of openings for adjustment by said micrometer.

8. Apparatus as in claim 6 wherein the micrometer is magnetically adhered to the reference surface.

* * * * *